Patented Mar. 9, 1926.

1,575,975

UNITED STATES PATENT OFFICE.

RAYMOND E. DALY, OF HOMEWOOD, ILLINOIS, ASSIGNOR TO AMERICAN MAIZE-PRODUCTS COMPANY, OF ROBY, INDIANA, A CORPORATION OF MAINE.

PRODUCTION OF CEREAL SUGAR IN LOAF OR BLOCK FORM.

No Drawing. Application filed December 30, 1924. Serial No. 758,875.

*To all whom it may concern:*

Be it known that I, RAYMOND E. DALY, a citizen of the United States, residing in Homewood, in the county of Cook and State of Illinois, have invented certain new and useful Improvements in the Production of Cereal Sugar in Loaf or Block Form, of which the following is a specification.

The invention relates to the production of cereal sugar in loaf or block form.

The crystallization of dextrose sugars, that is, sugars which are usually commercially produced from cereals, differs from the crystallization of cane and beet sugars in that the individual crystals are exceedingly fine and tend to form agglomerations which are more or less porous. Such sugars are extensively used for manufacturing purposes and the like but have found comparatively small demand for home consumption. Many efforts have been made to solidify dextrose sugar so as to put it in a more convenient form for table and other domestic uses. So far as I am aware, however, no satisfactory method has heretofore been devised for producing dextrose in compact loaf or block form.

The object of the present invention is to provide an improved method of treating dextrose sugar (and more particularly cereal sugar) so that it may be readily formed into loaves or blocks of the requisite dryness and density which will hold their lump form indefinitely without disintegration. To this end, the invention consists in the improved method hereinafter described and particularly pointed out in the claims, and in the product produced thereby.

In preparing the dextrose sugar for treatment by the method of the present invention, the usual processes are used up to the point where the sugar liquor is placed in a centrifugal to separate the crystals from the mother liquor. When the granular sugar is taken from the centrifugal, it contains approximately from 12% to 14% of moisture. The sugar is next placed in a form or receptacle of the requisite size and shape having a removable bottom and top, and in which the sugar crystals are subjected to high pressure, usually by means of a hydraulic press. In order to avoid the necessity of adding fresh quantities of sugar to that which has been partially pressed and thus to eliminate division planes or planes of stratification in the finished product, the form or mold is of such depth as to contain a sufficient quantity of unpressed sugar to give the requisite thickness of pressed sugar. Thus the form or mold is filled only once and the pressing is accomplished at one operation.

When the form or mold is placed in the press with the required amount of granular sugar in the form, the hydraulic ram is let down on the plate covering the sugar with a pressure which at first is relatively low and may vary from 50 to 150 pounds per square inch. This pressure is gradually raised until it reaches the most effective compressing point, depending on how hard it is desired the finished product shall be. In practice it has been found that highly satisfactory results are given by using a pressure which may vary from 200 to 500 pounds per square inch. At times pressures as high as 2000 pounds per square inch have been used. When the pressure has been raised to the requisite compressing point it is maintained at this point for about three minutes, after which it is released and the bottom plate of the form is removed so that the pressed sugar may be forced out of the form by means of the ram.

The pressed sugar, which is now in the form of a slab or cake, is next placed in a drying chamber in which the excess moisture is driven from the sugar. The temperature of the drying chamber is maintained at about 90° F. When the slab or cake of sugar leaves the drying chamber, it contains from 8% to 10% of moisture. The slabs are then cut into cubes or blocks of requisite size for table or other domestic uses.

Having thus described the invention what I claim as new is:—

1. The method of converting granular dextrose sugar into loaf or block form which consists in, subjecting a mass of granular dextrose to hydraulic pressure which at first is relatively low, gradually increasing the pressure until it reaches an effective compressing point which may range from about 200 to about 2000 pounds depending on the desired hardness of the finished product, maintaining the pressure for about three minutes, drying the slab of compressed sugar so produced at a temperature of about 90° F. to remove excess moisture, and then cutting the slab of sugar into cubes or blocks of the requisite size.

2. The method of converting granular dextrose sugar into loaf or block form which consists in, taking the sugar from a centrifuge, the moisture of the sugar ranging from 12% to 14%, placing the granular sugar in a mold or form having a removable top and bottom, subjecting the sugar to pressure which is gradually increased up to an effective compressing point which may range from about 200 to about 2000 pounds depending on the desired hardness of the finished product, releasing the pressure, removing the bottom of the mold, using the press in which the sugar is pressed to force the slab of compressed sugar out of the mold, placing the slab of sugar in a drying chamber until the moisture is reduced to about 8% to 10%, and then cutting the slab of sugar into blocks of the requisite size.

3. The method of converting granular dextrose sugar into loaf or block form which consists in, subjecting granular dextrose sugar having a moisture of from 12% to 14% to hydraulic pressure until the sugar is compacted to the required density and then drying the cake of compressed sugar until its water content is reduced to from 8% to 10%, and finally cutting the cake of sugar into blocks of the required size.

4. As an article of manufacture a loaf or block of cereal sugar converted from its granular, relatively moist condition into a compact relatively dry block.

RAYMOND E. DALY.